Dec. 31, 1957    F. BONI, JR., ET AL    2,818,197
HEAD CLOSURE CONSTRUCTION FOR VERTICAL HEAT EXCHANGERS
Filed Sept. 19, 1955
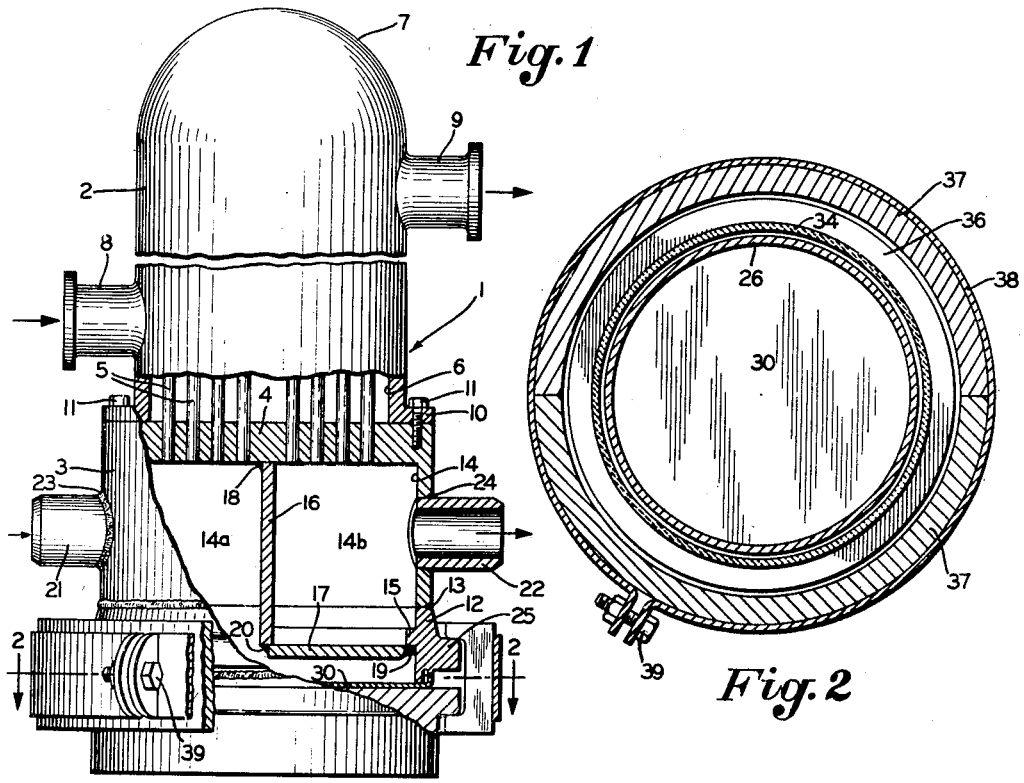
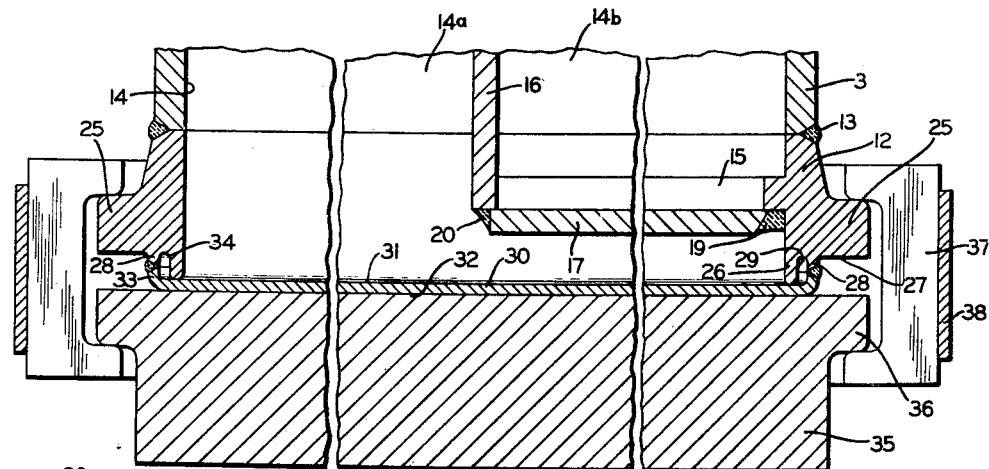
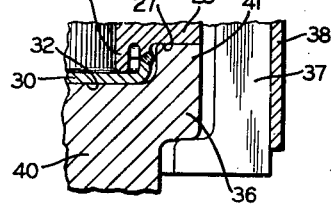
INVENTOR.
Frank Boni, Jr.
BY Karl A. Gardner
Frease & Bishop
ATTORNEYS

United States Patent Office 2,818,197
Patented Dec. 31, 1957

2,818,197

HEAD CLOSURE CONSTRUCTION FOR VERTICAL HEAT EXCHANGERS

Frank Boni, Jr., Massillon, and Karl A. Gardner, Canton, Ohio, assignors to The Griscom-Russell Company, Massillon, Ohio, a corporation of Delaware Application September 19, 1955, Serial No. 535,016

5 Claims. (Cl. 220—67)

This invention relates to heat exchangers or pressure vessels. More particularly, it pertains to a welded head closure construction for heat exchangers.

The present invention is a modification of the type of heat exchanger disclosed in co-pending U. S. patent application, Serial No. 337,324, filed February 17, 1953, of Frank Boni, Jr., now Patent No. 2,766,903, issued October 9, 1956.

The heat exchanger construction disclosed in said application includes a head barrel chamber having a tube sheet at one end. The other end is closed by a thin, metallic, diaphragm welded continuously about its periphery to the end of the head barrel. A head cover plate abuts the diaphragm on the outer side for reinforcement.

An advantage of that construction is sealing of the head chamber without gaskets. The diaphragm welded to the end of the head wall provides a leak-proof seal that functions at very high temperatures and pressures of operation. For example, a heat exchanger having a diaphragm closure may be operated at, say 5000 p. s. i. and at 1500° F. These conditions are not desirable with a gasketed seal.

In the above-mentioned patent application, the diaphragm closure is welded at its periphery to the end wall of the head barrel forming the head chamber. This construction serves satisfactorily for horizontal heat exchangers, because the welding operation is performed in a vertical plane.

However, it is not satisfactory for vertical heat exchangers with the head end down. Any welding required to replace the diaphragm subsequent to the removal of the diaphragm for inspection and repair would have to be done overhead. Overhead welding is awkward, and requires special electrodes and techniques. The combined results of all these difficulties is likely to result in an unsound weld which would be particularly intolerable for a joint between the diaphragm and head barrel of a high pressure feed water heater.

These problems may be overcome by a modified construction of the diaphragm. Instead of using a diaphragm that is flat and welded at its periphery to a flat end of the wall of the head barrel, the diaphragm is provided with a peripheral flange. The diaphragm may be horizontally disposed across the open end of the head chamber and the flange may be welded to the wall of the head chamber or barrel in a vertical plane.

The modified construction of the diaphragm also overcomes another difficulty inherent in the construction of the above-mentioned patent application, Serial No. 337,324. The modified construction is more flexible from the standpoint of differences in thermal expansion rates between the head barrel and the diaphragm under operating conditions.

Accordingly, it is a general object of this invention to provide a head closure construction for a vertical heat exchanger that overcomes the various difficulties heretofore encountered in closing and sealing the heat exchanger head chamber, particularly where high temperature and pressures are involved.

Another object of the present invention is to provide a closure construction for vertical heat exchangers that eliminates the need for special electrodes and techniques for overhead welding.

Another object of the present invention is to provide a head closure diaphragm for a vertical heat exchanger that accommodates differences in thermal expansion rates between the diaphragm and the head closure wall to which it is welded.

Another important object of the present invention is to provide a peripheral welding flange on a head closure diaphragm of a vertical heat exchanger to facilitate welding of the diaphragm horizontally in place.

Finally, it is an object of this invention to provide an improved head closure diaphragm for a vertical heat exchanger which incorporates the foregoing desiderata in an inexpensive manner and with simplified maintenance and operation.

These and other objects and advantages apparent to those skilled in the art from the following description and claims may be obtained, the stated results achieved and described difficulties overcome by the discoveries, principles, apparatus, parts, combinations, subcombinations and elements which comprise the present invention, the nature of which is set forth in the following statement, preferred embodiments of which, illustrative of the best modes in which applicants have contemplated applying the principles, are set forth in the following description, and which are particularly and distinctly pointed out and set forth in the appended claims forming part hereof.

Generally, the head closure construction for vertical heat exchangers of the present invention may be stated as including in a heat exchanger, a head including a tube sheet portion, and a barrel wall having inlet and outlet openings, the barrel wall terminating at its open end in an annular end surface lying in a plane preferably with a welding lip portion extending longitudinally therefrom, a flat thin-walled metal diaphragm having inner and outer surfaces and a peripheral flange, the flange being welded continuously about its periphery to the welding lip portion, a cover plate having a flat inner surface abutting the flat outer surface of the diaphragm, and means engaging the cover plate and the barrel wall at locations radially outward of the welded connection between said diaphragm and barrel wall removably securing said cover plate to the barrel wall in pressure-supporting engagement with the diaphragm.

In the accompanying drawings which are illustrative of preferred embodiments of the invention, by way of example, and in which similar numerals refer to similar parts thereof, wherein:

Fig. 1 is a vertical sectional view, partly in elevation, of one embodiment of the present invention;

Fig. 2 is a horizontal sectional view taken on the line 2—2 of Fig. 1;

Fig. 3 is an enlarged, fragmentary, vertical sectional view of the embodiment shown in Fig. 1; and Fig. 4 is a fragmentary sectional view of another embodiment of the invention.

A heat exchanger, generally indicated at 1, is shown in Fig. 1. It comprises a shell 2 and a head member 3 which are separated by a tube sheet 4. A plurality of tubes 5 extend from the tube sheet into a shell chamber 6 provided by the shell 2. The tubes 5 communicate with the interior of the head member 3.

For illustrative purposes, the upper end of the shell 2 is rounded at 7, indicating that the tubes 5 are U-shaped. Thus, the heat exchanger 1 is a U-tube heat exchanger. However, it is understood that the shell 2 may be disposed between similar head members 3 in which event the rounded end 7 of the shell would be eliminated.

The shell 2 is provided with a fluid inlet 8 and a fluid outlet 9. Moreover, the shell 2 is provided with an annular flange 10 by which the shell and the head member 3 are connected by bolts 11.

As shown in Figs. 1 and 3 at the end of the head member 3 remote from the tube sheet 4, a head barrel end portion 12 is secured in a fluid-tight manner by a weld 13 extending around the joint therebetween. The inner surfaces of the head member 3 and the head barrel end portion 12 are of equal diameter and they form a head chamber 14 with which the tubes 5 communicate.

Within the chamber 14 is a semi-circular rib 15 extending inwardly from the inner surface of the head barrel end portion 12. Inasmuch as the tubes 5 are U-tubes, the chamber 14 is divided into in-coming and out-going fluid compartments 14a and 14b by baffle partitions 16 and 17. The partition 16 is secured to the head side of the tube sheet 4 in a fluid-tight manner, such as by a weld 18, as well as to opposite sides of the inner surface of the head member 3. Likewise, the baffle partition 17 is disposed in abutment with the rib 15 where it is secured by a weld 19 in a fluid-tight manner. In addition, the adjacent ends of the partitions 16 and 17 are secured together in a fluid-tight manner by a weld 20.

In this manner, fluid enters the head compartment 14a through a fluid inlet 21 from where it passes into the tubes 5 which communicate with the head compartment 14b. From there the fluid passes through a fluid outlet 22. As shown in Fig. 1, the fluid inlet 21 and the fluid outlet 22 are secured within wall of the head member 3 by means of welds 23 and 24, respectively.

As shown in Fig. 3, the head barrel end portion 12 includes an annular head flange 25 which extends outwardly from the outer surface thereof. In addition, the end portion 12 includes an annular lip or flange 26 extending longitudinally from a flat end wall 27 of the end portion. The inner surface of the flange 26 is preferably of the same diameter as the inner surface of the end portion 12 so that the flange 26 actually comprises an extension of the head chamber 14. Moreover, an annular welding lip or flange 28 extends from the flat end wall 27 from the end portion 12 and is concentrically disposed with respect to the annular flange 26. Between the flanges 26 and 28 is a trepan groove 29 which will be further described below.

The end of the head member 3 remote from the tube sheet 4 is closed by a thin-walled, flexible, flat diaphragm 30 having greater diameter than the inner surface of the head chamber 14. The diaphragm 30 has inner and outer surfaces 31 and 32 and when assembled the inner surface 31 closes the end of the head chamber 14, as shown in Fig. 3, by completely covering the opening. The inner surface 31 is disposed against the outer end of the circular flange 26. The diaphragm 30 is provided with a peripheral flange 33 extending inwardly and in alignment with the annular welding lip or flange 28 to which it is connected in a fluid-tight manner by a weld 34 extending continuously around and between abutting ends of the aligned flanges 28 and 33. The purpose of the trepan groove 29 is to provide the welding flange 28 with a thickness comparable to that of the diaphragm flange 33 so that both flanges will present comparable metal thicknesses to facilitate application of the weld 34.

With the weld 34 applied between flanges 28 and 33, as shown in Fig. 3, the welding operation may be performed with comparative ease because the operation is applied to a vertical surface. The ease of performing the weld 34 in a vertical plane is compared with the difficulty of applying an overhead weld to the undersurface of a flat diaphragm without the upturned flange 33.

The diaphragm 30 is reinforced by a circular cover or closure plate 35 which abuts the outer surface 32 of the diaphragm over its entire flat area within the flange 26. The plate 35 holds the diaphragm 30 against the flange 26. The closure plate 35 has an outturned flange 36 similar in shape and dimensions to the flange 25 on the head barrel end portion 12. The flanges 25 and 36 comprise a portion of a means by which the closure plate 35 is secured in place. The means also includes a plurality of ring segments 37 which are preferably semi-circular (Fig. 2), and which are channel-shaped or U-shaped in cross section to span and interlock the flanges 25 and 36 as shown in Fig. 3. After the ring segments 37 have been assembled they are secured together by a lock strap 38 which is retained in place around the segments 37 by a nut and bolt assembly 39.

Another embodiment of the invention is shown in Fig. 4 in which a closure plate 40 is provided with an annular lip 41 bearing against or seated at the outer circumference of the flat end wall 27 of the flange 25.

The head closure construction for vertical heat exchangers of the present invention is an improvement over previous construction for several reasons. In the first place, a long standing problem of awkwardness in welding a diaphragm head closure to the end wall of the head barrel is solved. By providing the diaphragm closure member with a peripheral flange the weld may be performed in a vertical plane, rather than overhead in a horizontal plane, without the use of special electrodes and techniques. In the second place, the provision of the diaphragm with a peripheral flange satisfies the differences in the expansion rates between the head barrel wall and the diaphragm under operating conditions. Finally, the present construction is adapted to relatively easy maintenance and repair of the heat exchange tubes and head chamber because access thereto by removability of the diaphragm is facilitated by locating the weld in a vertical cylindrical plane around the lower end of the head chamber rather than in the undersurface.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown.

Having now described the features, constructions and principles of invention, the characteristics of the new heat exchanger head closure construction, and the advantageous, new and useful results provided; the new and useful discoveries, principles, parts, elements, combinations, subcombinations, structures and arrangements, and mechanical equivalents obvious to those skilled in the art, are set forth in the appended claims.

We claim:

1. Head closure construction for vertical heat exchangers, including an annular metal head barrel wall, said wall terminating in an annular open end and having a plurality of radially spaced axially extending annular flanges, a thin-walled metal diaphragm having inner and outer surfaces, the diaphragm also having an axially extending annular flange welded continuously to one of the barrel wall annular flanges, a cover plate having a flat inner surface engaging the flat outer surface of the diaphragm throughout the extent of the diaphragm and seating the diaphragm against the other barrel wall annular flange, and means removably securing the cover plate to the barrel wall in pressure-supporting engagement with the diaphragm.

2. Head closure construction for vertical heat exchangers including an annular metal head barrel wall forming a head chamber, said wall terminating in an annular open end, the barrel wall having a first annular flange portion extending axially thereof, the barrel end wall also having a second annular welding flange concentrically disposed with respect to the first flange, the second flange having a diameter greater than that of the first flange, a thin-walled metal diaphragm having inner and outer surfaces and having an annular peripheral flange welded continuously to the second flange on the barrel wall, the inner surface of the diaphragm engaging the first annular flange on the barrel wall, a cover plate having a flat inner surface engaging the entire flat outer surface of the diaphragm, and means removably securing the cover plate to the barrel wall in pressure-supporting engagement with the diaphragm.

3. The construction defined in claim 2 in which the first annular flange has an inner diameter equal to that of the head chamber.

4. The construction defined in claim 2 in which the barrel wall has a third radially extending flange surrounding the first and second flanges, and in which the cover plate is seated against the third flange when secured to the barrel wall.

5. Head closure construction for vertical heat exchangers, including an annular metal head barrel wall, said wall terminating in an annular open end and having an axially extending annular flange, the flange having a diameter greater than that of the head barrel inner surface, a thin-walled metal diaphragm having inner and outer surfaces, the diaphragm also having an axially extending annular flange welded continuously to the barrel wall annular flange in end-to-end abutment, a cover plate having a flat inner surface engaging the flat outer surface of the diaphragm throughout the extent of the diaphragm, and means removably securing the cover plate to the barrel wall in pressure-supporting engagement with the diaphragm.

References Cited in the file of this patent
UNITED STATES PATENTS

| | | |
|---|---|---|
| 1,888,899 | Wolf | Nov. 22, 1932 |
| 2,647,656 | Frisch | Aug. 4, 1953 |